United States Patent
Albrecht et al.

(10) Patent No.: US 6,187,887 B1
(45) Date of Patent: Feb. 13, 2001

(54) WATER-SOLUBLE OR WATER-SWELLABLE COPOLYMERS CONTAINING SULFONIC GROUPS AND METHODS OF PREPARATION

(75) Inventors: Gerhard Albrecht, Tacherting; Christian Huber, Garching; Manfred Schuhbeck, Trostberg; Josef Weichmann, Pleiskirchen; Alfred Kern, Kirchweidach, all of (DE)

(73) Assignee: SKW Bauchemie GmbH, Trostberg (DE)

( * ) Notice: Under 35 U.S.C. 154(b), the term of this patent shall be extended for 0 days.

(21) Appl. No.: 09/250,327

(22) Filed: Feb. 16, 1999

(30) Foreign Application Priority Data

Feb. 17, 1998 (DE) ................................................ 198 06 482

(51) Int. Cl.⁷ .................................................... C08F 26/08
(52) U.S. Cl. ............................................ 526/264; 526/287
(58) Field of Search ...................... 526/264, 287

(56) References Cited

U.S. PATENT DOCUMENTS

| | | |
|---|---|---|
| 4,674,574 | 6/1987 | Savoly . |
| 4,741,843 | 5/1988 | Garvey . |
| 5,025,040 | 6/1991 | Crema . |
| 5,294,651 | 3/1994 | Stephens . |
| 6,043,329 | * 3/2000 | Lepori .................................. 526/287 |

FOREIGN PATENT DOCUMENTS

| | | |
|---|---|---|
| 3302168 | 7/1984 | (DE) . |
| 3402935 | 8/1984 | (DE) . |
| 3905915 | 9/1990 | (DE) . |
| 0157055 | 10/1985 | (EP) . |
| 0196689 | 10/1986 | (EP) . |
| 0217608 | 4/1987 | (EP) . |
| 0291590 | 11/1988 | (EP) . |
| 8500802 | 2/1985 | (WO) . |
| 9217417 | 10/1992 | (WO) . |

OTHER PUBLICATIONS

Patent Abstract of Japan JP–09087576.
Patent Abstract of Japan JP–09111180.

* cited by examiner

Primary Examiner—Christopher Henderson
(74) Attorney, Agent, or Firm—Fulbright & Jaworksi, LLP

(57) ABSTRACT

Water-soluble or water-swellable copolymers containing sulfonic groups and based on (meth)acrylamide alkyl sulfonic acids and (meth)acrylamide or N-vinyl compounds are described, as well as their use as additives in aqueous building material mixes or for water-based painting and coating systems. The copolymers of the invention, even when used in relatively small quantities, serve as very effective and highly compatible water retention agents in such building material mixes and surface-coating systems.

11 Claims, No Drawings

WATER-SOLUBLE OR WATER-SWELLABLE COPOLYMERS CONTAINING SULFONIC GROUPS AND METHODS OF PREPARATION

SPECIFICATION

This invention relates to water-soluble and water-swellable copolymers containing sulfonic groups, methods of preparing them, and the use of these polymers in aqueous building materials based on hydraulic binders such as cement, lime, gypsum, anhydrite etc., and in water-based painting and coating systems.

As a rule, water-soluble, non-ionic polysaccharide derivatives, especially cellulose and starch derivatives, are used in aqueous building material mixes in order to prevent or at least delay the undesired evaporation of water required for hydration and processing, or the draining off of the water into the substrate.

Being able to regulate the water content in paint systems, plasters, adhesive mortars, trowelling compounds and joint fillers, as well as in shotcrete for tunnel construction and in underwater concretes, with these additives has far-reaching practical consequences. The additives have a considerable influence on the properties of the building material while it is in workable condition, and also on its properties when it has set and/or dried. By way of improving water retention capacity, these modifiers also influence consistency (plasticity), the open time, smoothing property, segregation, tackiness, adhesion (to the substrate and to the tool), non-sag property and slip resistance, tensile bond and compressive strength, and also shrinkage.

The most common water retention agents, according to Ullmann's Enzyklopädie der Technischen Chemie (4th edition, vol. 9, pages 208–210, publishing house Chemie Weinheim), are synthetic, non-ionic cellulose and starch derivatives such as methyl cellulose (MC), hydroxyethyl cellulose (HEC) and hydroxyethylmethyl cellulose (HEMC). However, the prior art also decribes the use of microbially produced polysaccharides such as Welan gum, and of naturally occurring polysaccharides (hydrocolloids) that are isolated by extraction, such as alginates, xanthanes, carageenanes, galactomannanes etc., to regulate water content and the rheology of aqueous building materials and paint systems.

The DE-OS 43 35 437 describes the preparation of alkyl celluloses, eg, methyl cellulose from sodium cellulose and methyl chloride.

The EP-A 292 242 discloses the synthesis of hydroxypropylmethyl cellulose from cotton linters, methyl chloride and propylene oxide. To prepare the HEMC derivatives described in the DE-OS 33 16 124, use is made of ethylene oxide instead of propylene oxide.

The disadvantage of these products is the use of raw materials such as ethylene oxide, propylene oxide and methyl chloride in the production process, which are known to pose a physiological risk.

The use of non-ionic cellulose derivatives in the building materials and paints sectors is described in a number of publications, eg, in the DE-OS 39 34 870. Such products exhibit low thermal flocculation points, and as a result water retention decreases drastically attemperatures above 30° C. An additional disadvantage is that the rheological properties of these products are unsatisfactory in paint systems, because pigments are not dispersed properly due to the additives'lacking the necessary adsorptive force. These problems can be solved by using cellulose ethers which contain ionic groups.

The U.S. Pat. No. 5,372,642, for example, describes methylhydroxyalkyl carboxymethyl celluloses which, used in lime- and cement-based mixes, do not cause a reduction in water retention when the application temperature is raised from 20 to 40° C. However, a general incompatibility with multivalent cations such as $Ca^{2+}$ and $Al^{3+}$, which would lead to flocculation and render these products ineffective, cannot be altogether excluded.

Sulfo-alkylated cellulose derivatives are described, among other publications, in the EP-A 0 554 749. Compared to carboxymethylated products, they exhibit excellent compatibility with multivalent cations, but when used in adhesive mortars or in plasters they delay setting. An additional disadvantage of such products is the inadequate sag or slip resistance in adhesive mortars, especially where heavy tiles are used.

The sag or slip resistance can be increased, as described in the U.S. Pat. No. 4,021,257, by modifiying or formulating cellulose ethers with polyacrylamide. The disadvantage here, however, is that under alkaline conditions polyacrylamide releases ammonia, making interior applications appear problematic.

The object of this invention was thus to develop water-soluble or water-swellable copolymers, with which the aforementioned disadvantages of the prior art are at least partially overcome, and which, in particular, are effective at comparatively high temperatures, which can be readily prepared by way of environmentally sound methods, and which, in addition, confer excellent applicational properties on building material mixes and paint systems, both when they are in workable condition and after they have set and/or dried.

This object was established with the copolymers according to claim 1. Surprisingly, it was found that even when used in small quantities, copolymers containing sulfonic groups serve as very effective and highly compatible water retention agents in building material mixes and paint systems, and have properties which are superior to those of products currently in use.

The copolymers described in this invention contain at least four structural components a), b), c) and d). The first structural component is a substituted acrylic or meithacrylic derivative which contains a sulfonic group and has the formula 1:

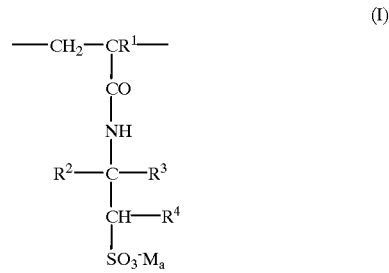

where $R^1$=hydrogen or methyl, $R^2$, $R^3$ and $R^4$=hydrogen, an aliphatic hydrocarbon radical with 1 to 6 C atoms, an aryl radical with 6 to 14 C atoms, which may be substituted with $C_1$–$C_6$ alkyl groups, eg, a phenyl radical which may be substituted with methyl groups, and M=hydrogen, a mono- or bivalent metal cation, ammonium or an organic amino radical, and a=½ or 1. As mono- or bivalent metal cation, use is made preferably of sodium, potassium, calcium and/or magnesium ions. As organic amino radicals, use is made preferably of substituted ammonium groups, which are derived from primary, secondary or tertiary $C_1$–$C_{20}$ alkylamines, $C_1$–$C_{20}$ alkanolamines, $C_5$–$C_8$ cycloalkylamines and $C_6$–$C_{14}$ arylamines. Examples of such amines are methylamine, dimethylamine, trimethylamine, ethanolamine, diethanolamine, triethanolamine, cyclohexylamine, dicyclohexylamine, phenylamine and diphenylamine in the protonated ammonium form.

The structural component a) is derived from monomers such as 2-acrylamido-2-methylpropane sulfonic acid, 2-methacrylamido-2-methylpropane sulfonic acid, 2-acrylamidobutane sulfonic acid, 3-acrylamido-3-methylbutane sulfonic acid, and 2-acrylamido-2,4,4-trimethylpentane sulfonic acid. Special preference is given to 2-acrylamido-2-methylpropane sulfonic acid.

The second structural component b) has the formula IIa and/or IIb:

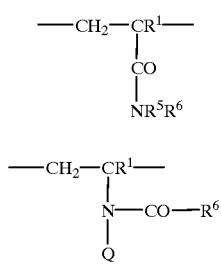

(IIa)

(IIb)

where $R^1$ has the meaning already given. $R^5$ and $R^6$ stand, independently of one another, for hydrogen, an aliphatic hydrocarbon radical with 1 to 20 C atoms, an alicyclic hydrocarbon radical with 5 to 8 C atoms, or an aryl radical with 6 to 14 C atoms. These radicals may contain one or more substituents, such as hydroxyl, carboxyl and/or sulfonic groups.

In formula 11b, Q stands for hydrogen or —$CHR^5R^7$. Where $Q \neq H$ in structure IIb, $R^5$ and $R^6$ can also stand together for a —$CH_2$—$(CH_2)_y$-methylene group in which y=1 to 4 and which, in combination with the rest of formula IIb, can form a five-to eight-membered heterocyclic ring.

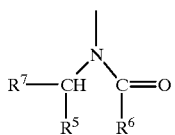

$R^7$ may be a hydrogen atom, a $C_1$, to $C_4$ alkyl radical, a carboxylic acid group or a carboxylate group —$COOM_a$, where M and a have the meanings already given.

As monomers which form structure IIa, preference is given to the following compounds: acrylamide, methacrylamide, N-methylacrylamide, N,N-dimethyl acrylamide, N-ethyl acrylamide, N-cyclohexyl acrylamide, N-benzyl acrylamide, N-methylol acrylamide, N-tertiary butyl acrylamide etc. Examples of monomers on which structure IIb may be based include N-methyl-N-vinyl formamide, N-methyl-N-vinyl acetamide, N-vinyl pyrrolidone, N-vinyl caprolactam and N-vinylpyrrolidone-5-carboxylic acid among others.

The third structural component c) has the formula III:

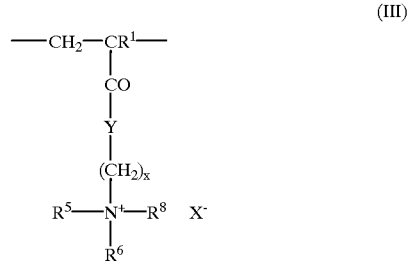

(III)

where X=anion, especially halide (preferably Cl, Br), $C_1$- to $C_4$-alkyl sulfate or $C_1$- to $C_4$- alkyl sulfonate, x=1 to 6, Y=O, NH or $NR_8$, with $R^8=R^5$ or $R^6$, and $R^5$ and $R^6$ having the meanings already given.

As monomers which can be used to form structure c), use may be made, in particular, of the following compounds: [2-(acryloyloxy)-ethyl]-trimethyl ammoniumchloride, [2-(acryloylamino)-ethyl]-trimethylammoniumchloride, [2-(acryloyloxy)-ethyl]-trimethyl ammonium methosulfate, [2-(methacryloyloxy)-ethyl]-trimethyl ammonium chloride or methosulfate and [3-(methacryloylamino)-propyl]-trimethyl ammonium chloride.

The fourth structural component d) has the formula IV

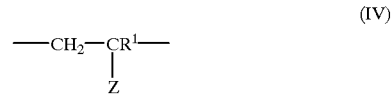

(IV)

where $R_1$ has the meaning already given and Z=—COO $(C_mH_{2m}O)_nR^5$ and —$CH_2)_pO(C_mH_{2m})_nR^5$, with p=0 to 20, m=2 to 4 and n=0 to 200. The structural component d) is chiefly derived from monomers such as polyethylene glycol 750 monomethyl ether methacrylate, polyethylene glycol 500 ether acrylate, polyethylene glycol 350 monoallyl ether, polyethylene glycol 2000 methyl vinyl ether, triethylene glycol monophenyl ether acrylate, hydroxyethyl acrylate, hydroxypropyl acrylate, hydroxypropyl methacrylate, polyethylene glycol 500 vinyloxy butyl ether, polyethylene glycol block propylene glycol methyl allyl ether, etc.

All the monomers which form the structural components a) to d) are mono-unsaturated compounds, the macromolecular structure of which, for the most part, is linear. For certain types of application, however, it can be to advantage if the polymer chains are branched or cross-linked. In order to obtain such structures, the copolymers of the invention can contain from 0.0001 to 50 mol. % of structural component e), being derived, eg, from monomers with more than one double bond, namely from di- and tri-olefinic compounds in a preferred proportion of 0.001 to 5 mol. %. Examples of such compounds include diacrylate or dimethylacrylate esters of ethylene glycol, diethylene glycol, polyethylene glycol, propylene glycol, polypropylene glycol or block copolymers of ethylene and propylene glycol, diallyl or divinyl ethers of ethylene glycol or propylene glycol, 1,4-butanediol, 1,5-pentanediol, or 1,6-hexanediol. It is also possible to use N, N'-methylene-bis-acrylamide or N,N'-methylene-bis-methacrylamide as di-olefinic compounds, or, eg, trimethylolpropane triacrylate or triallyl isocyanurate as tri-olefinic monomers.

The structural component e) can also derive from mono-olefinic polymerizable compounds, eg, acrylic- or vinyl-based compounds, in a preferred proportion of 0.1 to 30 mol.

%. Examples of such compounds are: acrylonitrile, styrene, ethylene, butadiene, propylene, isobutene, vinyl acetate, acrylic acid, methacrylic acid, methyl acrylate, methyl methacrylate, ethyl acrylate, butyl acrylate, ethylhexyl acrylate, allyl acetate, maleic acid, maleic anhydride, diethyl maleate, dibutyl maleate, fumaric acid, itaconic acid, dodecenylsuccinic anhydride, vinylsulfonic acid and styrene sulfonic acid.

It is essential to the invention that the copolymers contain 3 to 96 mol. % of structural component a), 3 to 96 mol. % of structural component b) 0.05 to 75 mol. % of structural component c) and 0.01 to 50 mol. % of structural component d), expressed in terms of the total monomer unit mole count. Preferably-used polymers contain 40 to 80 mol. % a), 15 to 55 mol. % b), 2 to 30 mol. % c) and 0.5 to 10 mol. % d).

The number of structural units in the copolymers of the invention is not limited and depends strongly on the type of application in question. It has proved beneficial, however, to adjust the number of structural units such that the copolymers have a number average molecular weight of 50 000 to 5 000 000.

The copolymers of the invention are prepared in familiar manner through linkage of the monomers which form structures a) to d) and, where applicable, also e) by means of free-radical, ionic or complex coordinate bulk, solution, gel, emulsion, dispersion or suspension polymerization. Since the copolymers of the invention are water-soluble or water-swellable compounds, polymerization in the aqueous phase, in reverse emulsion or in inverse suspension is preferred. In particularly preferred embodiments, the reaction is conducted as an aqueous solution or gel polymerization or as an inverse suspension polymerization in organic solvents with the help of initiator radicals. If the polymerization is conducted in the aqueous phase, it is of advantage to employ gel polymerization, especially for preparing copolymers in the upper molecular weight range, such as those used in adhesive mortars and underwater concrete. On account of the very high solution viscosities of these products and the necessary high level of dilution, solution polymerization is economically less suitable.

This does not apply to copolymers of the invention that have molecular weights in the lower or medium molecular weight range (used in plasters and paint systems). These copolymers can be prepared perfectly well by means of aqueous solution polymerization.

The monomers are reacted at temperatures from −20 to 250° C. It is of advantage to conduct the polymerization at 20 to 120° C. with the help of a familiar initator radicals such as hydrogen peroxide, sodium, potassium or ammonium peroxodisulfate, dibenzoyl peroxide, 2,2'-azo-bis-(2-amidinopropane)-dihydrochloride, azo-bis-(isobutyronitrile) or tertiary butyl hydroperoxide, or physically by way of radiation, or else electrochemically. It is also possible to combine the above-mentioned initiators with reducing agents such as dibutylamine hydrochloride, Na-hydroxymethane sulfinate dihydrate, alkali metal sulfites and metabisulfites, thiourea, and transition-metal salts in the reduced form, such as iron (II) sulfate heptahydrate etc., to form redox systems. The use of other aids such as molecular-weight regulators, eg, mercaptoacetic acid, mercaptoethanol and sodium hypophosphite, is also possible.

If the preparation is conducted as an aqueous solution polymerization, the reaction is conducted to good effect at 20 to 100° C., with the concentration of monomer in the aqueous solution preferably adjusted to 5 to 20 wt. %. To conduct the polymerization according to a preferred embodiment, the sulfoalkyl acrylamide, in its commercially available acid form, is dissolved in water, neutralized by addition of an alkali-metal hydroxide, and, by way of stirring, mixed with other monomers to be used according to the invention, as well as with buffers, molecular-weight regulators and other polymerization aids. The mixture is adjusted to a pH value preferably between 4 and 9, is flushed with a protective gas such as helium or nitrogen, and is then heated to the required polymerization temperature. Polymerization is induced by addition of a polymerization initiator and allowed to proceed until the monomers have reacted completely. The copolymers, which are obtained as viscous, aqueous solutions, can be used either directly or in dried form for the applications as per the invention.

If the aqueous gel polymerization method is used to prepare the copolymers, the monomer concentration can range from 15 to 80 wt.%. The preferred temperature range is from 20 to 100° C. It is of advantage to proceed in the same manner as for the aqueous solution polymerization, although the copolymer is obtained as a gel due to the smaller amount of water used. It is beneficial to use the gel in dried, pulverized form.

In another preferred embodiment, the copolymer is formed by way of inverse suspension polymerization of the aqueous monomer phase in an organic solvent. It is of advantage here to proceed such that the monomer mix, dissolved in water and, if necessary, neutralized, is polymerized in the presence of an organic solvent in which the aqueous monomer phase is insoluble or poorly soluble. It is preferable to conduct the reaction in the presence of "water-in-oil" emulsifiers (W/O emulsifiers) and/or protective colloids based on low- or high-molecular compounds, the emulsifiers and/or colloids being used in proportions of 0.05 to 20 wt.%, expressed in terms of the monomers. Stabilizers of this kind include hydroxypropyl cellulose, ethyl cellulose, methyl cellulose, cellulose acetate butyrate ether blend, copolymers of ethylene and vinyl acetate, styrene and butyl acrylate, polyoxyethylene sorbitan mono-oleate, laurate and stearate, block copolymers of propylene and ethylene oxide, etc.

Suitable organic solvents include linear aliphatic hydrocarbons such as n-pentane, n-hexane and n-heptane, branched aliphatic hydrocarbons (isoparaffins), alicyclic hydrocarbons such as cyclohexane and decalin, and aromatics such as benzene, toluene and xylene. Use can also be made of alcohols, ketones, carboxylates, nitro compounds, halogenated hydrocarbons, ethers and many other solvents. Preference is given to those organic solvents that form azeotropic mixtures with water.

The water-soluble or water-swellable copolymers are obtained initially in dissolved form as finely dispersed aqueous droplets in the organic suspension medium, and are preferably isolated as solid, spherical particles in the organic suspension medium by removing the water. The suspension medium is separated off and the product dried to give a granular solid, which can be used directly or in ground form for the applications as per the invention.

The polymer compounds of the invention are excellently suited as additives for aqueous building material mixes which contain hydraulic binders such as cement, lime, gypsum, anhydrite etc. They can also be used in water-based paint and coating systems.

The copolymers of the invention are used in amounts which preferably lie between 0.05 and 5 wt. %, expressed in terms of the dry weight of the construction material, paint or coating system. The exact amounts will depend on the type of application.

The copolymers have excellent water retention properties, even when used at relatively high temperatures, and confer outstanding technical properties on pigmented surface-coating compounds, plasters, adhesive mortars, trowelling compounds, joint fillers, shotcrete, underwater concrete, oil-well drilling cement etc, both when they are in workable condition and after they have set and/or dried (tensile bond strength of adhesive mortars following immersion in water).

The following examples serve to explain the invention in more detail.

EXAMPLE 1

Solution Polymerization 550 g water were introduced into a 1 l polymerization reactor equipped with a stirrer, reflux condenser, thermometer and inert-gas connection. 20.61 g (0.0994 mol) of 2-acrylamido-2-methylpropane sulfonic acid were stirred in, and stirring continued until a clear solution was obtained. Following the addition of 0.50 g hydrated citric acid, 78.22 g of 5 wt. % aqueous caustic soda solution were stirrred in, the reactor being cooled during the addition, and the pH adjusted to 4.60. This was followed by the successive addition of 20.61 g (0.2079 mol) of N,N-dimethyl acrylamide, 3.05 g (0.011 mol) of (2-(methacryloyloxy)-ethyl( trimethyl ammonium chloride (75 wt. % solution in water) and 1.40 g (0.0017 mol) of polyethylene glycol 750 monomethyl ether methacrylate. The pH increased to 4.75. The solution was rendered non-reactive by flushing for 30 minutes with nitrogen, and heated to 40° C. This was followed by the succcessive addition of 4.4 mg iron sulfate heptahydrate and 0.76 g of 30 wt. % aqueous hydrogen peroxide. Polymerization was intiated by adding a solution of 0.57 g of sodium hydroxymethane sulfinate dihydrate in 44.1 9 g water. The contents of the reactor were stirred for 2 hours at 40° C. in order to complete the polymerization reaction. The highly viscous solution, which had a solids content of 6.3 wt. %, was then subjected to evaporation under vacuum. 45 g of a hard, white granulate were obtained, which was pulverized with a crusher.

EXAMPLE 2

Gel Polymerization 70.07 g (0.3381 mol) of 2-acrylamido-2-methylpropane sulfonic acid and 1.00 g citric acid monohydrate in 350 g water were introduced into a cylindrical, double-walled 1 l polymerization flask. 67.81 g of 20 wt. % aqueous caustic soda solution were stirred in, the flask being cooled during the addition, and the pH adjusted to 4.50. To the clear monomer solution, 12.37 g (0.1248 mol) of N,N-dimethyl acrylamide, 9.41 g (0.0266 mol) of [2-(methacryloyloxy)-ethyl] trimethyl ammonium methosulfate (80 wt. % in water) and 0.95 g (0.0017 mol) of polyethylene glycol 550 monoallyl ether were added. The mixture was flushed for 35 minutes with nitrogen. This was followed by successive addition of 8.8 mg iron sulfate heptahydrate, 1.52 g of 30 wt. % aqueous hydrogen peroxide and 1.90 g of a 10 wt. % aqueous sodium hydroxymethane sulfinate dihydrate solution. While being flushed with nitrogen, the reaction mixture was heated to an internal temperature of 40° C. As soon as this temperature was reached, polymerization began; this was evident from the vigorous exothermic reaction and from the fact that there was a noticeable rise in viscosity. After the temperature maximum of 65° C. had been reached, the reactor was held for a further 4 hours at a reactor jacket temperature of 40° C., and then cooled to room temperature.

The water-white gel obtained was broken up and dried at 90° C. under vacuum until of constant weight. When the product was ground, a 94.8 g yield of white, brittle powder was obtained.

EXAMPLE 3

Inverse Suspension Polymerization 200 g of cyclohexane and 1.50 g of ethyl cellulose (ethoxy content approx. 48.5%, degree of substitution approx. 2.50) were introduced into a 500 ml 4-necked flask equipped with a thermometer, stirrer, reflux condenser and inert-gas connection. After 30 minutes' deactivation, the contents of the flask were heated to the reflux temperature of 80° C. Over a period of 1 hour, an aqueous solution of 38.80 g (0.1872 mol) of 2-acrylamido-2-methylpropane sulfonic acid, 6.30 g (0.0636 mol) of N,N-dimethyl acrylamide, 4.05 g (0.0092 mol) of [3-(methacryloylamino)-propyl]trimethyl ammonium chloride (50 wt. % in water), 1.99 g (0.004 mol) polyethylene glycol 500 methyl vinyl ether, 35.95 g of 20 wt. % aqueous caustic soda solution, 0.012 g of 2,2'-azo-bis-(2-amidinopropane) dihydrochloride and 5 g water was added. After completion of the addition, the reaction mixture was stirred vigorously for another 2.5 hours at 75 to 80° C. and then, over a period of approx. 2 hours, the water was separated off azeotropically. After it had cooled to room temperature, the solid compound was obtained by filtration in the form of spherically formed particles. It was washed with a little cyclohexane, and dried under vacuum.

A yield of 54.3 g of fine, glass-like granulate was obtained, which was ground into a fine white powder.

EXAMPLE 4

Using the aqueous solution polymerization method, a mixture with the following composition was polymerized as in Example 1:
5.51 g (0.0266 mol) of 2-acrylamido-2-methylpropane sulfonic acid, which was neutralized with
21.26 g 5 wt. % aqueous caustic soda solution;
35.71 g (0.5024 mol) acrylamide;
7.39 g (0.0220 mol) of [2-(acryloyloxy)-ethyl]trimethyl ammonium methosulfate (80 wt. %);
3.97 g (0.0047 mol) polythylene glycol 750 monomethyl ether methacrylate;
11.2 mg iron sulfate heptahydrate;
2.03 g 30 wt. % aqueous hydrogen peroxide;
0.86 g sodium hydroxymethane sulfinate dihydrate;
750 g water.

After removal of the water from the highly viscous polymer solution, 49.8 g of a brittle, white residue were obtained, which was ground to a powder.

EXAMPLE 5

The procedure of Example 2 was repeated (gel polymerization), but using the following polymerization mixture:
15.00 g (0.0724 mol) of 2-acrylamido-2-methylpropane sulfonic acid, which was neutralized to a pH of 4.5 with 13.50 g 20 wt. % aqueous caustic soda solution;
150.00 g (1.7624 mol) methacrylamide
1.73 g (0.0049 mol) of [2-(methacryloyloxy)-ethyl] trimethyl-ammoniummethosulfate (80 wt. % in water);
0.49 g (0.0008 mol) polyethylene glycol 500 monomethyl ether maleinate;
550 g water.

The mixture was deactivated, heated to 80° C., and the polymerization initiated by addition of 0.0822 g ammonium peroxodisulfate. The reaction mixture was held at 80° C for 4 hours, and then cooled to room temperature.

The water-white gel obtained was broken up, dried and ground (yield: 165.9 g).

EXAMPLE 6

Example 3 was repeated, but instead of the N,N-dimethyl acrylamide, use was made of 6.30 g (0.0636 mol) of N-methyl-N-vinyl acetamide. 52.9 g of hard, white powder were obtained.

EXAMPLE 7

Instead of the N,N-dimethyl acrylamide used in Example 3, 6.30 g (0.0567 mol) N-vinyl pyrrolidone were used. The yield of brittle, white end product was 53.3 g.

EXAMPLE 8

The procedure was analogous to that of Example 3, but toluene was used instead of cyclohexane as organic suspension medium. As initiator, use was made of 0.012 g of ammonium peroxodisulfate. Polymerization was carried out at 110° C. over a period of 5 hours. Following complete removal of the water, the solid product was separated from the toluene, washed with a little fresh toluene, dried and ground. 56.0 g of white powder were obtained.

EXAMPLE 9

The synthesis described in Example 3 was repeated, except that the protective colloid used there, ethyl cellulose, was replaced by a mixture of 1.6 g of polyoxyethylene-20-sorbitan monooleate and 0.8 g sorbitan monostearate. 54.0 g of white end product were obtained.

EXAMPLE 10

Using a procedure analogous to that of Example 3, use was made, as suspension stabilizer, of a mixture of 1.7 g of polyoxyethylene-20-sorbitan monooleate, 0.1 g of ethyl cellulose, and 0.3 g of a block copolymer of ethylene oxide (EO) and propylene oxide (PO), with 20 mol % EO and a molecular weight of approx. 12 000 g/mol. The yield was 55.7 g.

Comparative Example 1

Commercially available methylhydroxypropyl cellulose, with a solution viscosity of 790 mm$^2$/s (measured as 1% aqueous solution at 20° C. as per Ubbelohde). Comparative Example 2

Hydroxyethyl sulfoethyl cellulose according to the EP-A-0 554 749 (with a solution viscosity of 1010 mm$^2$/s at 20° C., measured as per Ubbelohde). Comparative Example 3

Commercially available methylhydroxyethyl cellulose with a solution viscosity of 1950 mm$^2$/s (1% solution, 20° C., measured as per Ubbelohde).

Application Examples

The practical suitability of the copolymers of the invention was assessed on the basis of test mixes of machine-applied and combination plasters, and of adhesive mortars for tiles.

To this end, under conditions simulating actual practice, tests were conducted on ready-mix formulations to which the additives of the invention or the comparative products were added in solid form. After the additives had been blended in, a defined quantity of water was added and stirred vigorously with a hand-operated mixer (duration approx. 15 to 45 seconds, depending on the application in question). The mix was then left to mature for a period between 2 minutes (plaster) and 15 minutes (adhesive mortar) before undergoing initial visual inspection. This was followed by standard determination of consistency (slump test as per German standard DIN 18555, part 2), entrained air, slip (laid tiles 10×10 cm) after 30 seconds, water retention as per DIN 18555, part 7, and setting characteristics (qualitative).

The composition of the machine-applied and combination plasters, and of the adhesive mortar for tiles, is given in Table 1.

The test results are contained in tables 2 (machine-applied plaster), 3 (combination plaster) and 4 (adhesive mortar for tiles).

TABLE 1

Mortar mix compositions (in wt. %)

| Components | Machine-applied plaster | Combination plaster | Adhesive mortar |
|---|---|---|---|
| Portland cement | — | 12.00[1] | 36.00[2] |
| Hydrated lime | 10.00 | 8.00 | — |
| Limestone sand (0.1–1 mm) | 50.68 | 77.62 | — |
| Plaster of Paris (hemi-hydrate gypsum plaster) | 39.00 | — | — |
| Quarz sand (0.5–0.4 mm) | — | — | 56.90 |
| White pigment[3] | — | — | 5.50 |
| Cellulose fibers[4] | — | — | 0.50 |
| Redispersible powder[5] | — | 2.00 | — |
| Setting accelerator[6] | — | — | 0.80 |
| Air entrainer[7] | 0.02 | 0.03 | — |
| Water retention agent | 0.20 | 0.30 | 0.30 |
| Setting retarder[8] | 0.10 | 0.05 | — |

[1]CEM II 32.5 R
[2]CEM II 42.5 R
[3]Ulm white "Juraperle MHS"
[4]Arbocel HHC 200
[5]Mowilith DM 200
[6]Calcium formate
[7]Hostapon OSB
[8]Tartaric acid

TABLE 2

Comparison of the processing and setting properties of a lime-gypsum based machine-applied plaster containing copolymers of the invention with the properties of the same plaster containing conventional additives

| Additive (example-no.) | Solution viscosity* (1%; mm²/s) | Water amount (g) | Slump (cm) | Entrained air (vol. %) | Water retention (%) | Hardness after 24 h (visual) |
|---|---|---|---|---|---|---|
| 1 | 490 | 690 | 14.3 | 19.3 | 98.7 | hard |
| 2 | 950 | 700 | 15.0 | 17.0 | 98.9 | hard |
| 3 | 1 870 | 770 | 13.9 | 20.9 | 99.4 | hard |
| 4 | 730 | 700 | 15.0 | 19.9 | 98.1 | hard |
| 5 | 800 | 700 | 13.9 | 16.4 | 98.9 | hard |
| 6 | 1 510 | 765 | 14.4 | 21.3 | 99.4 | hard |
| 7 | 1 320 | 715 | 15.0 | 20.0 | 99.3 | hard |
| 8 | 990 | 700 | 14.9 | 24.8 | 99.0 | hard |
| 9 | 1 700 | 790 | 14.1 | 25.2 | 98.8 | hard |
| 10 | 1 820 | 785 | 14.0 | 20.1 | 98.5 | hard |
| Comparison 1 | 790 | 715 | 14.2 | 23.7 | 98.0 | hard |
| Comparison 2 | 1 010 | 705 | 14.0 | 9.8 | 97.1 | hard |

*20° C., Ubbelohde, solvent: water
Quantity added: 0.20 wt. % (plus 0.02 wt. % air entrainer)
Ready-mix mortar: 2 000 g

TABLE 3

Comparison of the processing properties of a cementitious combination plaster containing copolymers of the invention with the properties of the same plaster containing conventional additives

| Additive (example. no.) | Water amount (g) | Slump (cm) | Entrained air (vol. %) | Water retention (%) |
|---|---|---|---|---|
| 1 | 570 | 15.4 | 14.9 | 99.1 |
| 4 | 560 | 15.4 | 15.7 | 99.3 |
| 5 | 540 | 15.7 | 13.0 | 99.4 |
| 7 | 600 | 15.0 | 15.9 | 99.6 |
| 8 | 550 | 14.9 | 14.0 | 99.0 |
| Comparison 1 | 540 | 15.6 | 13.4 | 98.4 |
| Comparison 2 | 580 | 15.0 | 11.0 | 97.9 |

Quantity added: 0.30 wt. %
Ready-mix mortar: 2000 g

TABLE 4

Comparison of the processing properties of a ceramic-tile adhesive mortar modified with polymers of the invention with the properties of the same mortar modified with prior art polymers

| Additive (example-no.) | Water amount (g) | Slump (cm) | Entrained air (vol. %) | Water retention (%) | Slip (mm) |
|---|---|---|---|---|---|
| 2 | 540 | 14.9 | 13.0 | 97.8 | 1 |
| 3 | 560 | 14.6 | 15.8 | 98.4 | 0 |
| 6 | 530 | 15.0 | 14.2 | 97.9 | 0 |
| 7 | 540 | 15.2 | 12.7 | 98.0 | 1 |
| 8 | 530 | 15.0 | 13.7 | 97.4 | 1 |
| 9 | 540 | 14.6 | 15.9 | 98.2 | 0 |
| 10 | 570 | 14.7 | 16.9 | 98.3 | 0 |
| Comparison 2 | 530 | 15.6 | 10.9 | 97.7 | 2 |
| Comparison 3 | 540 | 14.9 | 17.0 | 98.1 | 1 |

Quantity added: 0.30 wt. %
Adhesive mortar: 2000 g

In addition, the knock-off resistance and tensile bond strength of mortars modified with the copolymers of the invention were compared with those of prior art formulations. The results are contained in Table 5.

TABLE 5

Comparison of the setting properties of tile adhesives containing copolymers of the invention with those of tile adhesives containing conventional additives

| Additive (example no.) | Knock-off resistance (qualitative) | Scratch resistance (visual) | Wetting (visual) | Adhesive bond strength 28 d (N/mm²) |
|---|---|---|---|---|
| 2 | high | good - average | good | 1.04 |
| 3 | very high | good | very good | 1.57 |
| 6 | very high | good | very good | 1.63 |
| 7 | very high | good | very good | 1.11 |
| 8 | high | good | good | 0.99 |
| 9 | very high | good | very good | 1.50 |
| 10 | very high | good | very good | 1.06 |
| Comparison 2 | high | good | good | 0.89 |
| Comparison 3 | average | good - average | good | 0.82 |

Quantity added: 0.30 wt. %
Adhesive mortar: 2000 g

In yet another test, the water retention of a machine-applied plaster modified with the products of the invention was determined, also at an elevated application temperature of 40° C., and was compared with the results obtained for conventional cellulose-based additives. To this end, the ready-mix mortar, the mixing water and the apparatus used were preheated over a period of 6 hours to 40° C. The results of this test are contained in Table 6.

TABLE 6

Comparison of the water retention at elevated temperatures of machine-applied plasters modified with copolymers of the invention and that of plasters modified with prior art additives

| | | | 20° C. | | 40° C. | |
|---|---|---|---|---|---|---|
| Additive (example no.) | Solution viscosity * (1%, mm²/s) | Water (g) | Slump (cm) | Water retention (%) | Slump (cm) | Water retention (%) |
| 1 | 490 | 690 | 14.3 | 98.7 | 13.7 | 98.0 |
| 3 | 1870 | 770 | 13.9 | 99.4 | 13.6 | 98.4 |

TABLE 6-continued

Comparison of the water retention at elevated temperatures of machine-applied plasters modified with copolymers of the invention and that of plasters modified with prior art additives

| Additive (example no.) | Solution viscosity * (1%, mm²/s) | Water (g) | 20° C. Slump (cm) | 20° C. Water retention (%) | 40° C. Slump (cm) | 40° C. Water retention (%) |
|---|---|---|---|---|---|---|
| 6 | 1510 | 765 | 14.4 | 99.4 | 13.9 | 98.9 |
| 8 | 990 | 700 | 14.9 | 99.0 | 14.1 | 98.6 |
| 9 | 1700 | 790 | 14.1 | 98.8 | 13.5 | 98.8 |
| 10 | 1820 | 785 | 14.0 | 98.5 | 13.9 | 98.7 |
| Comparison 1 | 790 | 715 | 14.2 | 98.0 | 13.4 | 97.1 |
| Comparison 2 | 1010 | 705 | 14.0 | 97.1 | 13.9 | 89.0 |

\* 20° C., Ubbelohde, H$_2$O
Quantity added: 0.20 wt. % (plus 0.02 wt. % air entrainer)
Ready-mix mortar: 2000 g

What is claimed is:

1. Water-soluble or water-swellable copolymers with sulfonic groups, containing
   a) 3 to 96 mol. % of structural components having the formula I

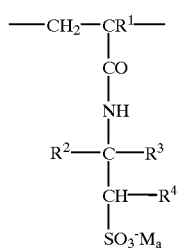

(I)

where
R$^1$=hydrogen or methyl,
R$^2$, R$^3$, R$^4$, independently of one another, are each hydrogen,
an aliphatic hydrocarbon radical with 1 to 6 C atoms, or an aryl radical with 6 to 14 C atoms, which may be substituted with C$_1$–C$_6$ alkyl groups,
M=hydrogen, a mono- or bivalent metal cation, ammonium and/or an organic amino radical, and
a=½ or 1,
   b) 3 to 96 mol. % of structural components having the formula IIa or IIb

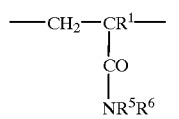

(IIa)

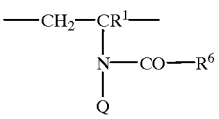

(IIb)

where R$^5$ and R$^6$, independently of one another, are each hydrogen, an aliphatic hydrocarbon radical which may be substituted and has 1–20 C atoms, an alicyclic hydrocarbon radical which may be substituted and has 5 to 8 C atoms, or an aryl radical which may be substituted and has 6 to 14 C atoms, and
Q=hydrogen or —CHR$^5$R$^7$, and where Q≠H,
R$^5$ and R$^6$ in IIb together form a —CH$_2$—(CH$_2$)$_y$-methylene group in which y=1 to 4,
R$^7$=hydrogen, an aliphatic hydrocarbon radical with 1 to 4 C atoms, —COOH or —COOM$_a$, and
R$^1$, M and a have the meanings already given,
   c) 0.05 to 75 mol. % of structural components having the formula III

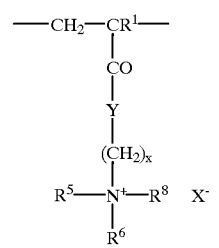

(III)

where
Y=O, NH or NR$^5$
R$^8$=R$^5$ or R$^6$,
X=anion, especially halide, C$_1$ to C$_4$-alkyl sulfate or C$_1$ to C$_4$-alkyl sulfonate,
x=1 to 6, and
R$^1$, R$^5$ and R$^6$ have the meanings already given,
   d) 0.01 to 50 mol % of structural components having the formula IV

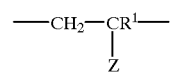

(IV)

where
Z=—COO(C$_m$H$_{2m}$O)$_n$—R$^5$ or —(CH$_2$)$_p$—O(C$_m$H$_{2m}$O)$_n$—R$^5$,
m=2 to 4,
n=0 to 200
p=0 to 20, and
R1 has the meaning already given.

2. The copolymers of claim 1, wherein
M is a mono- or bivalent metal cation selected from sodium, potassium, calcium and magnesium.

3. Copolymers according to claim 1, wherein
M is an organic amino radical selected from substituted ammonium groups which are derived from primary, secondary or tertiary C$_1$ to C$_{20}$ alkylamines, C$_1$ to C$_{20}$ alkanolamines, C$_5$ to C$_8$ cycloalkylamines and C$_6$ to C$_{14}$ arylamines.

4. Copolymers according to claim 1, wherein the hydrocarbon or aryl radicals of R5 and R6 are substituted with hydroxyl, carboxyl and/or sulfonic acid groups.

5. Copolymers according to claim 1, wherein X=chlorine or bromine.

6. Copolymers according to claim 1, wherein the copolymers contain, in addition, 0.0001 to 50 mol % of structural components e), which are derived from polymerizable mono-, di- and tri-olefinic compounds.

7. The copolymers of claim 6, wherein the di-olefinic compounds are selected from diacrylate or dimethylacrylate esters.

8. The copolymers of claim 6, wherein trimethylolpropane triacrylate and triallyl isocyanurate are used as tri-olefinic monomers.

9. The copolymers of claim 6, wherein the mono-olefinic compounds are selected from acrylic or vinyl derivatives.

10. Copolymers according to claim 1, wherein the copolymers consist of 40 to 80 mol % of structural component a), 15 to 55 mol % of structural component b), 2 to 30 mol. % of structural component c) and 0.5 to 10 mol % of structural component d).

11. Copolymers according to claim 1, wherein the copolymers have a number average molecular weight of 50 000 to 5 000 000.

* * * * *

UNITED STATES PATENT AND TRADEMARK OFFICE
CERTIFICATE OF CORRECTION

PATENT NO. : 6,187,887 B1
DATED : February 13, 2001
INVENTOR(S) : Albrecht et al.

It is certified that error appears in the above-identified patent and that said Letters Patent is hereby corrected as shown below:

Title page,
U.S. PATENT DOCUMENTS, add
-- 5,109,042   4/1992   Stephans
   5,362,829  11/1994  Kinoshia et al. --.

FOREIGN PATENT DOCUMENTS, add
-- 9,012,822  11/1990   WO
   0487975    6/1992    EP
   0448717    10/1991   EP
   0757998    2/1997    EP --.

OTHER ARTICLES, add
-- Chemical Abstracts, vol. 110, no.22,29.05.89 of JP-63270332, 08.11.88, Kyoritsu Yuki Co. Ltd. --.

Column 2,
Line 42, change "meithacrylic" to -- methacrylic --.

Column 9,
Lines 63-64, start new paragraph with -- Comparative Example 2 --.

Column 10,
Lines 3-4, start new paragraph with -- Comparative Example 3 --.

Signed and Sealed this

First Day of January, 2002

Attest:

JAMES E. ROGAN
Attesting Officer          Director of the United States Patent and Trademark Office